United States Patent
Qian et al.

(10) Patent No.: US 12,271,906 B2
(45) Date of Patent: Apr. 8, 2025

(54) SYSTEM AND METHOD FOR MANAGING ISSUES THROUGH RESOURCE OPTIMIZATION

(71) Applicant: Dell Products L.P., Round Rock, TX (US)

(72) Inventors: Ming Qian, Allston, MA (US); Anne-Marie Mcreynolds, San Jose, CA (US); Christopher O'Bryon Hill, Bellevue, WA (US)

(73) Assignee: Dell Products L.P., Round Rock, TX (US)

( * ) Notice: Subject to any disclaimer, the term of this patent is extended or adjusted under 35 U.S.C. 154(b) by 191 days.

(21) Appl. No.: 18/145,081

(22) Filed: Dec. 22, 2022

(65) Prior Publication Data
US 2024/0211963 A1    Jun. 27, 2024

(51) Int. Cl.
| | |
|---|---|
| G06Q 10/06 | (2023.01) |
| G06Q 10/0631 | (2023.01) |
| G06Q 10/0639 | (2023.01) |
| G06Q 30/01 | (2023.01) |
| G06Q 30/015 | (2023.01) |

(52) U.S. Cl.
CPC ... *G06Q 30/015* (2023.01); *G06Q 10/063112* (2013.01); *G06Q 10/06398* (2013.01)

(58) Field of Classification Search
CPC .............................. G06Q 10/06; G06Q 30/01
USPC ........................................................ 705/7.14
See application file for complete search history.

(56) References Cited

U.S. PATENT DOCUMENTS

| | | | |
|---|---|---|---|
| 9,451,090 B2 | 9/2016 | Konig | |
| 10,229,370 B1 | 3/2019 | Merritt | |
| 11,528,362 B1* | 12/2022 | Bhat | H04M 3/5183 |
| 11,720,857 B2 | 8/2023 | Bar-on | |
| 11,803,861 B2* | 10/2023 | Roebuck | G06F 16/335 |

(Continued)

FOREIGN PATENT DOCUMENTS

| | | |
|---|---|---|
| CN | 204680025 U | 9/2015 |
| CN | 105656696 A | 6/2016 |

(Continued)

OTHER PUBLICATIONS

Ahmad, Muneeb Imtiaz et al., "A framework to estimate cognitive load using physiological data." Personal and Ubiquitous Computing (2020): 1-15 (15 Pages).

(Continued)

*Primary Examiner* — Nga B Nguyen
(74) *Attorney, Agent, or Firm* — WOMBLE BOND DICKINSON (US) LLP

(57) ABSTRACT

Methods and systems for managing customer-encountered issues are disclosed. To manage the customer-encountered issues, a multiphase optimization process may be implemented to select a service agent to resolve each customer-encountered issue. The multiphase analysis may include a process of identifying service agents qualified to attempt to resolve each customer-encountered issue. The multiphase optimization may also include a process of ranking the qualified service agents based on their past performance and experience. The multiphase optimization may also include a process for estimating the likelihood of each of the qualified service agents resolving each customer-encountered issue within prescribed goals.

20 Claims, 5 Drawing Sheets

(56) References Cited

U.S. PATENT DOCUMENTS

| | | |
|---|---|---|
| 2005/0043986 A1 | 2/2005 | McConnell |
| 2009/0222436 A1 | 9/2009 | Nastacio |
| 2009/0313202 A1 | 12/2009 | Grabarnik |
| 2010/0318400 A1 | 12/2010 | Geffen |
| 2011/0219360 A1 | 9/2011 | Srinivasa |
| 2014/0156365 A1 | 6/2014 | Porter |
| 2015/0081611 A1 | 3/2015 | Shivakumar |
| 2015/0254406 A1 | 9/2015 | Rajasenan |
| 2015/0347950 A1* | 12/2015 | Goyal ............. G06Q 10/06393 705/7.39 |
| 2015/0350435 A1 | 12/2015 | Connolly |
| 2016/0239487 A1 | 8/2016 | Potharaju |
| 2017/0124184 A1 | 5/2017 | Podgorny |
| 2017/0132210 A1 | 5/2017 | Prasad |
| 2017/0178145 A1 | 6/2017 | Adrian |
| 2017/0188926 A1 | 7/2017 | Oobayashi |
| 2017/0316438 A1 | 11/2017 | Konig |
| 2018/0114173 A1 | 4/2018 | Blomberg |
| 2018/0159982 A1 | 6/2018 | Konig |
| 2019/0026697 A1 | 1/2019 | Burton |
| 2019/0050319 A1 | 2/2019 | Gondalia |
| 2019/0205891 A1* | 7/2019 | Roebuck ............... H04L 67/535 |
| 2020/0090087 A1 | 3/2020 | Singh |
| 2020/0120208 A1 | 4/2020 | Agarwal |
| 2020/0151648 A1* | 5/2020 | Gorny ..................... G06F 40/20 |
| 2020/0204682 A1* | 6/2020 | Gorny ................. G06Q 30/016 |
| 2020/0302364 A1 | 9/2020 | Singh |
| 2021/0013321 A1 | 1/2021 | Yogendra |
| 2021/0014136 A1 | 1/2021 | Rath |
| 2021/0158234 A1* | 5/2021 | Sivasubramanian ........................ H04M 3/5166 |
| 2021/0350251 A1 | 11/2021 | Lewis |
| 2021/0406973 A1* | 12/2021 | Nahamani ............. G06F 40/205 |
| 2022/0207538 A1* | 6/2022 | Booher ................... H04L 51/02 |
| 2022/0270019 A1* | 8/2022 | Mujumdar ............ G06F 16/245 |
| 2022/0300885 A1* | 9/2022 | Yannam ........... G06Q 10/06398 |
| 2023/0306436 A1 | 9/2023 | Chauhan |
| 2024/0073170 A1 | 2/2024 | Martin |
| 2024/0212838 A1 | 6/2024 | Wei |

FOREIGN PATENT DOCUMENTS

| | | |
|---|---|---|
| CN | 108510419 A | 9/2018 |
| WO | 2009033339 A1 | 3/2009 |

OTHER PUBLICATIONS

Skelton, Matthew et al., "Team Cognitive Load", IT Revolution, Jan. 19, 2021, <https://itrevolution.com/articles/cognitive-load/> (10 Pages).

Lee, Marshall G et al., "Proficiency Scoring in a Contact Center: An Alternative Method of AHT Analytics", Society of Workforce Planning Professionals<https://swpp.org/member/newsletter-archive/spring10/proficiency.html> (3 Pages), Aug. 30, 2022.

DeVore, Greg, "What is Time to Proficiency, and How Does it Affect Your Call Center?", Screensteps, Sep. 24, 2020, <https://blog.screensteps.com/call-center-time-to-proficiency> (8 Pages).

"Advanced Work Assignment", ServiceNow Product Documentation, <https://docs.servicenow.com/en-US/bundle/sandiego-servicenow-platform/page/administer/advanced-work-assignment/concept/awa-overview.html> (4 Pages), Aug. 30, 2022.

"Work assignments", ServiceNow Product Documentation, <https://docs.servicenow.com/bundle/sandiego-servicenow-platform/page/administer/advanced-work-assignment/concept/awa-assignment.html> (2 Pages), Aug. 30, 2022.

Nellimarla, Neeraja et al., "Set up skills, create a rating model, and assign agents" Microsoft Dynamics 365, <https://learn.microsoft.com/en-us/dynamics365/customer-service/setup-skills-assign-agents?tabs=customerserviceadmincenter> (7 Pages), Aug. 30, 2022.

"Service channels", ServiceNow Product Documentation, <https://docs.servicenow.com/bundle/sandiego-servicenow-platform/page/administer/advanced-work-assignment/concept/awa-service-channels.html> (3 Pages), Aug. 30, 2022.

"Optimize your metadata", University Library Guides, Jönköping University, <https://guides.library.ju.se/c.php?g=657658&p=4629486> (2 Pages), Aug. 30, 2022.

Choi, Sungbin, et al., "Combining relevancy and methodological quality into a single ranking for evidence-based medicine." Information Sciences 214 (2012): 76-90 (8 Pages).

Mohamad Amin Osman et al., "Ontology-Based Knowledge Management Tools for Knowledge Sharing in Organization-A Review", 2022, IEEE Access, vol. 10, Apr. 28, 2022, pp. 43267-43283 (Year: 2022).

* cited by examiner

SYSTEM AND METHOD FOR MANAGING ISSUES THROUGH RESOURCE OPTIMIZATION

FIELD

Embodiments disclosed herein relate generally to issue management. More particularly, embodiments disclosed herein relate to systems and methods to manage issues through optimization.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
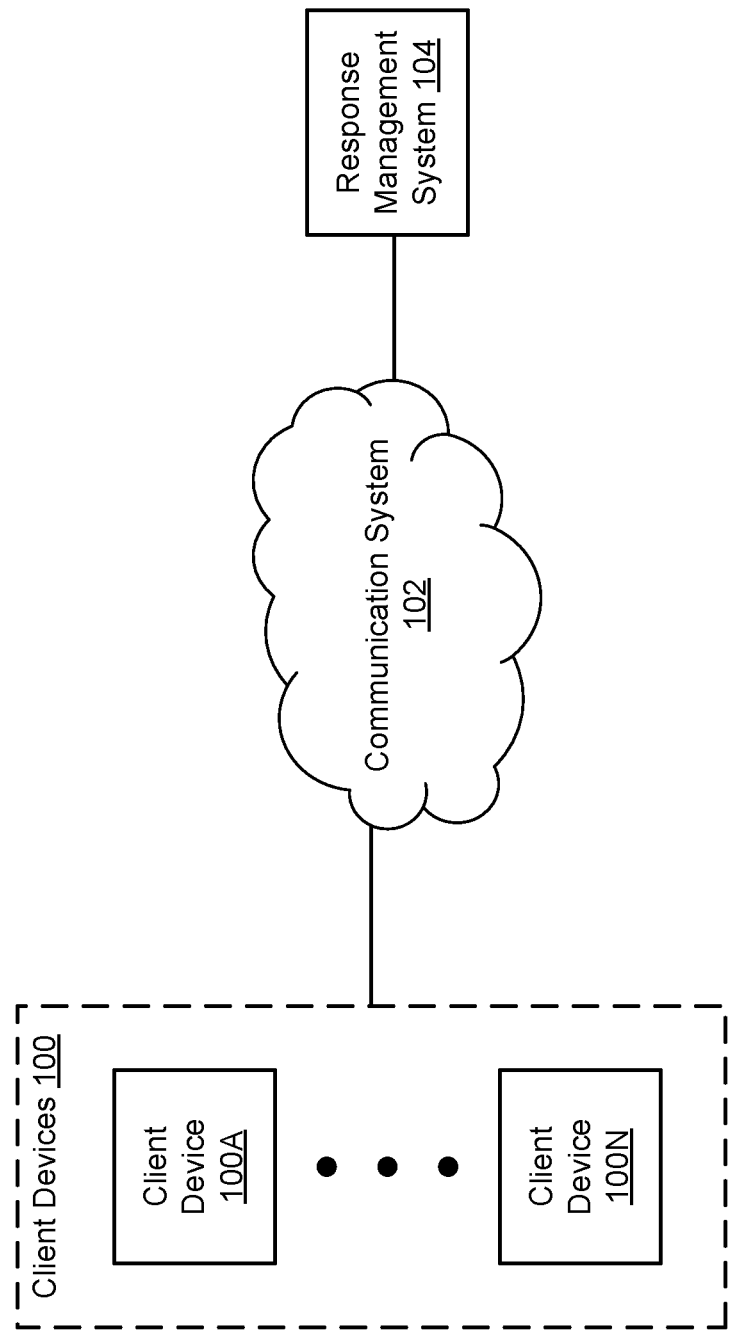
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing customer-encountered issues. To manage the customer-encountered issues, service requests for the customer-encountered issues may be serviced by service agents. However, the number of service agents may be limited thereby limiting the customer-encountered issues that may be serviced per unit time. Additionally, in the event that a service agent is assigned to resolve a service request but fails, the service request may be escalated and assigned to another service agent to resolve thereby further reducing the rate of resolution and increasing time to resolution. Further, even if a proficient service agent is assigned to resolve a service request, the assigned service agent may do so in a time inefficient manner depending on the service agent's level of experience.

To improve the rate of resolving customer-encountered issues within prescribed time goals, a multiphase optimization procedure may be implemented. During a first phase of the optimization, service agents having sufficient skill and of sufficient level (e.g., qualified service agents) likely to be able to resolve a customer-encountered issue are identified. The service agents may be identified through cognitive load analysis and skills analysis based on taxonomic analysis.

During a second phase of the optimization, the qualified service agents may be ranked based on their past performances resolving similar customer-encountered issue and experience level with respect to similar customer-encountered issued.

During a third phase of the optimization, the qualified service agents may be analyzed based on the rankings, goals for completing resolution of the customer-encountered issue (e.g., time, cost, etc.), current workload, impact of assigning each service agent to work the customer-encountered issue, and/or other factors. The analysis may identify one of the qualified service agents that is most likely to be able to resolve the customer-encountered issue within the set goals.

The identified qualified service agent may be assigned to work the customer-encountered issue until resolved or escalated. After resolution or escalation, information regarding the performance of the service agent and the customer-encountered issue may be recorded so that future assignment processes may be more likely to result in desired outcomes (e.g., resolutions of customer-encountered issues within prescribed goals).

Thus, embodiments disclosed herein may address the technical problem of resource limitations in response management systems. Due to limited availability of resources, only certain numbers and types of remediation processes may be implemented per unit time. By performing a multiphase optimization process, the limited quantity of resources may be able to resolve more customer-encountered issues per unit time and in accordance with prescribed goals.

In an embodiment, a method for managing customer-encountered issues using service agents is disclosed. The method may include identifying a portion of the service agents that are qualified to handle a customer-encountered issue of the customer-encountered issues; ranking the service agents of the portion of the service agents based on efficiency estimates for resolving the customer-encountered issue by the service agents to obtain a first ranking; ranking the service agents of the portion of the service agents based on alignment between the customer-encountered issue and previously resolved customer-encountered issues to obtain a second ranking; selecting a service agent of the service agents to remediate the customer-encountered issue based on the first ranking and the second ranking; and resolving the customer-encountered issue by assigning the selected service agent to work the customer-encountered issue.

The portion of the service agents may be identified based on a cognitive load estimate for resolving the customer-encountered issue, a skill estimate for resolving the customer-encountered issue, and skill ratings for the portion of the service agents.

Ranking the service agents of the portion of the service agents based on the efficiency estimates for resolving the customer-encountered issue may include identifying a type of the customer-encountered issue; for each service agent of the portion of the service, identify an average time to resolution of previously resolved customer-encountered issues of the type of the customer-encountered issue and that were resolved by each service agent; ordering the service agents of the portion of the service agents based on the average time to resolution associated with each of the service agents of the portion of the service agents to obtain the first ranking.

Ranking the service agents of the portion of the service agents based on the alignment between the customer-encountered issue and other customer-encountered issues resolved by the service agents to obtain a second ranking may include identifying attributes of the customer-encountered issue; for each service agent of the portion of the service: identify attributes of the previously resolved customer-encountered issues that were resolved by each service agent, and obtaining a metric indicating a level of the alignment between the attributes of the customer-encountered issue and the attributes of the previously resolved customer-encountered issues that were resolved by each service agent; ordering the service agents of the portion of the service agents based on the metric to obtain the second ranking.

Selecting the service agent of the service agents to remediate the customer-encountered issue based on the first ranking and the second ranking may include identifying a sub-portion of the portion of the service agents based on the first ranking and the second ranking; and identifying a service agent of the sub-portion of the portion of the service agents that has available cognitive bandwidth to resolve the customer-encountered issue within a time to resolution goal.

The time to resolution goal may be based, at least in part, on a context switching time for the customer-encountered issue.

Obtaining the metric indicating the level of the alignment may include identifying, for the customer-encountered issue, at least one attribute of the attributes from a group consisting of: a product grouping; a product reporting group; a case type; a case error code; a case microcode; a software version; a severity level; a top level case category; and a case detailed category.

Obtaining the metric indicating the level of the alignment may also include comparing the identified at least one of the attributes to corresponding attributes of the previously resolved customer-encountered issues on a per attribute basis to identify aligned attributes and unaligned attributes; and calculating the metric based on the aligned attributes and unaligned attributes.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer-implemented services, the system may include any number of client devices 100. Client devices 100 may provide the computer implemented services to users of client devices 100 and/or to other devices (not shown). Different client devices (e.g., 100A, 100N) may provide similar and/or different computer implemented services.

To provide the computer-implemented services, client devices 100 may include various hardware components (e.g., processors, memory modules, storage devices, etc.) and host various software components (e.g., operating systems, application, startup managers such as basic input-output systems, etc.). These hardware and software components may provide the computer-implemented services via their operation.

To provide certain computer-implemented services, the hardware and/or software components of client devices 100 may need to operate in predetermined manners. If the hardware and/or software components do not operate in the predetermined manners, then a client device may be unable to provide all, or a portion, of the computer-implemented services that it normally provides (and may be expected by the users of the client device to reliably provide).

The hardware and/or software components of client devices 100 may operate differently (e.g., in an undesirable manner) from the predetermined manners for any number of reasons. For example, any of the hardware and/or software components may malfunction. In another example, the hardware and/or software components may be operating nominally but in undesirable manners through various interactions such as resource conflicts or constraints. In a further example, various configuration settings of the hardware and/or software components may be set (intentionally or inadvertently) in a manner that causes the operation of any of client devices 100 to be undesirable. The hardware and/or software components of client devices 100 may operate different from the predetermined manners for other reasons (e.g., various root causes) without departing from embodiments disclosed herein. Thus, a client device may not provide its computer-implemented services for any number of reasons which may be difficult to identify.

The undesired operation of client devices 100 may take any number of forms which may be linked to a root cause of the undesired operation. For example, an undesired operation of a client device may be a lack of operation such as failing to power on when a power button is depressed. In another example, an undesired operation of a client device may be a failure of the client device to utilize a full width of a display when presenting information to a user via the display. In a further example, an undesired operation of a client device may be inconsistent operation of the client device over time such as the client device intermittently freezing for periods of time during which the client device is unresponsive to a user and/or other devices. The undesired operation of client devices 100 may manifest in other manners without departing from embodiments disclosed herein. Thus, a client device may manifest any number of undesired operations which may be due to any number of root causes.

To improve the likelihood of client devices 100 providing desired computer implemented services, the system of FIG.

1 may include response management system (RMS) 104. RMS 104 may be tasked with addressing undesired operation of any of client devices 100. However, RMS 104 may have limited resources with which to address the undesired operation of client devices 100.

In general, embodiments disclosed herein may provide methods, systems, and/or devices for managing undesired operation of client devices 100. To manage the undesired operation (e.g., also referred to as a "client encountered issue") of client devices 100, RMS 104 may provide remediation services to address the undesired operation of client devices 100. The remediation services may include diagnosing, managing, and otherwise resolving the undesired operation.

To provide the remediation services, service agents (e.g., trained persons) may be assigned to address the undesired operation of client devices 100. However, the number of service agents available to work the customer-encountered issues to resolution may be limited.

To improve the rate of resolution of the customer-encountered issue, the system may assign service agents to work customer-encountered issues based on a combination of demonstrated capabilities of the service agents, estimates needs to resolve the customer-encountered issues, and/or other factors.

To initially identify service agents that are proficient in resolving customer-encountered issues, the system may identify (i) a level of support likely to be required to resolve customer-encountered issues (e.g., based on cognitive load analysis of customer-encountered issues) and (ii) levels of skills of the service agents (e.g., based on taxonomic analysis of customer-encountered issues). The available service agents may be filtered to identify a set of service agents that both meet the expected level of support and are likely to have the skills needed to resolve the customer-encountered issues.

Once the set of service agents are identified, the system may identify (i) the level efficiency that the set of service agents have demonstrated with respect to similar customer-encountered issues in the past, (ii) the level of experience that the set of service agents have with respect to similar customer-encountered issues in the past, and (iii) the current workload and other factors that may limit the ability of the set of service agent to take on a new workload. The set of service agents may be ranked, filtered, and/or otherwise searched based on these factors to identify a service agent to remediate each customer-encountered issues.

By doing so, the time to resolve customer-encountered issues may be reduced. For example, by selecting the service agents in the manner as discussed herein, remediation failures may be reduced. Consequently, these customer-encountered issues may not be worked on by service agents that are unlikely to resolve the customer-encountered issues. Accordingly, the customer-encountered issues may be remediated more quickly on average by avoiding (i) failed attempts at resolution by service agents, (ii) delays in escalation of failed attempts at resolution, and/or (iii) other delays in resolution of customer-encountered issues due to initial assignment of customer-encountered issues to service agents that are unlikely to be able to resolve the issues.

Figure 2A:
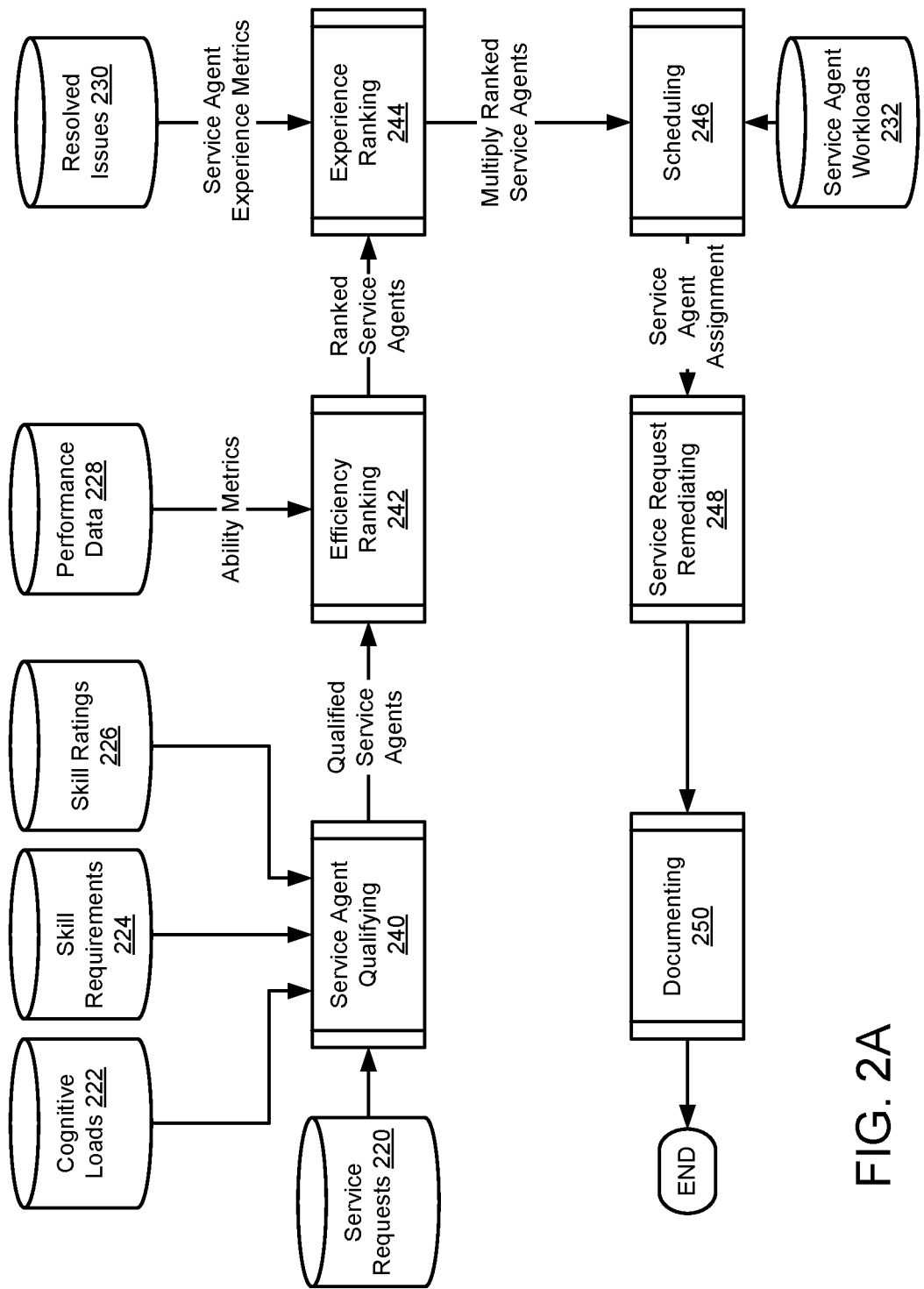
FIGS. 2A-2B show diagrams illustrating data flows, processes, and other aspects of a system in accordance with an embodiment.
Figure 2B:
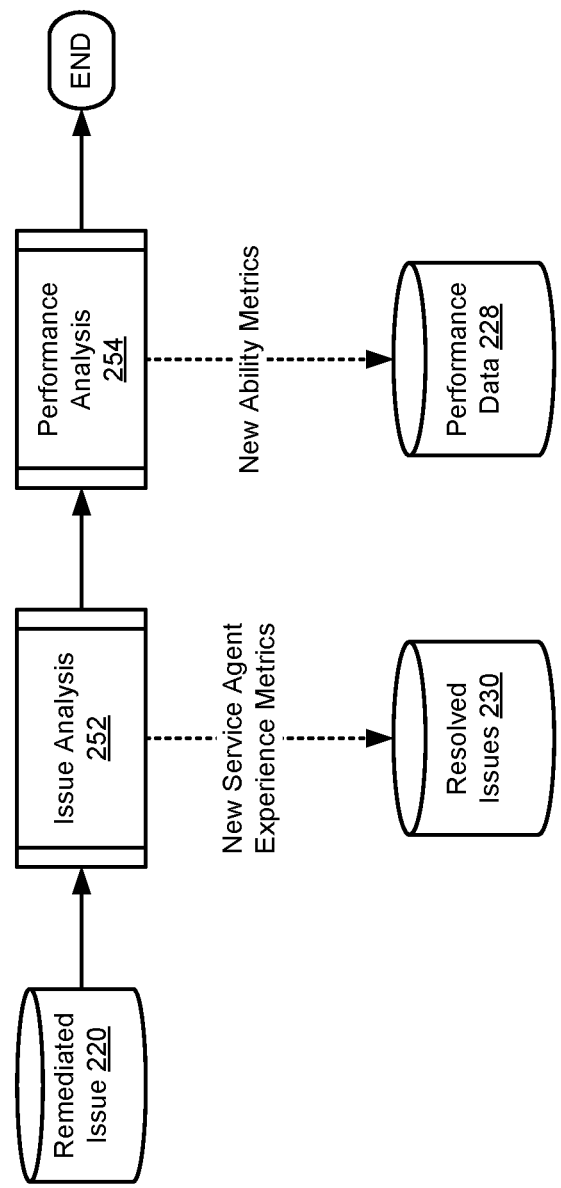

To provide the remediation services, RMS 104 may (i) receive information (e.g., telemetry data such as error alerts, logs that indicate operation of a client device, etc.) from users of client devices 100 regarding various customer-encountered issues (e.g., undesired operation of client devices 100 encountered by users thereof) with respect to client devices 100, (ii) perform skill level and support level analysis to identify a set of service agents likely to be proficient in resolving the customer-encountered issues, (iii) perform efficiency, similarity, and scheduling analysis with respect to the service agents to identify one of the set of the service agents to remediate the issue, (iv) assign the identified service agent to work the customer-encountered to resolution (or until escalated due to failure to resolve the customer-encountered issue), and/or (v) document the resolution so that future assignments of service agents are completed using up to date information. Refer to FIGS. 2A-B for additional details regarding assignment of service agents to work customer-encountered issues.

Figure 3:
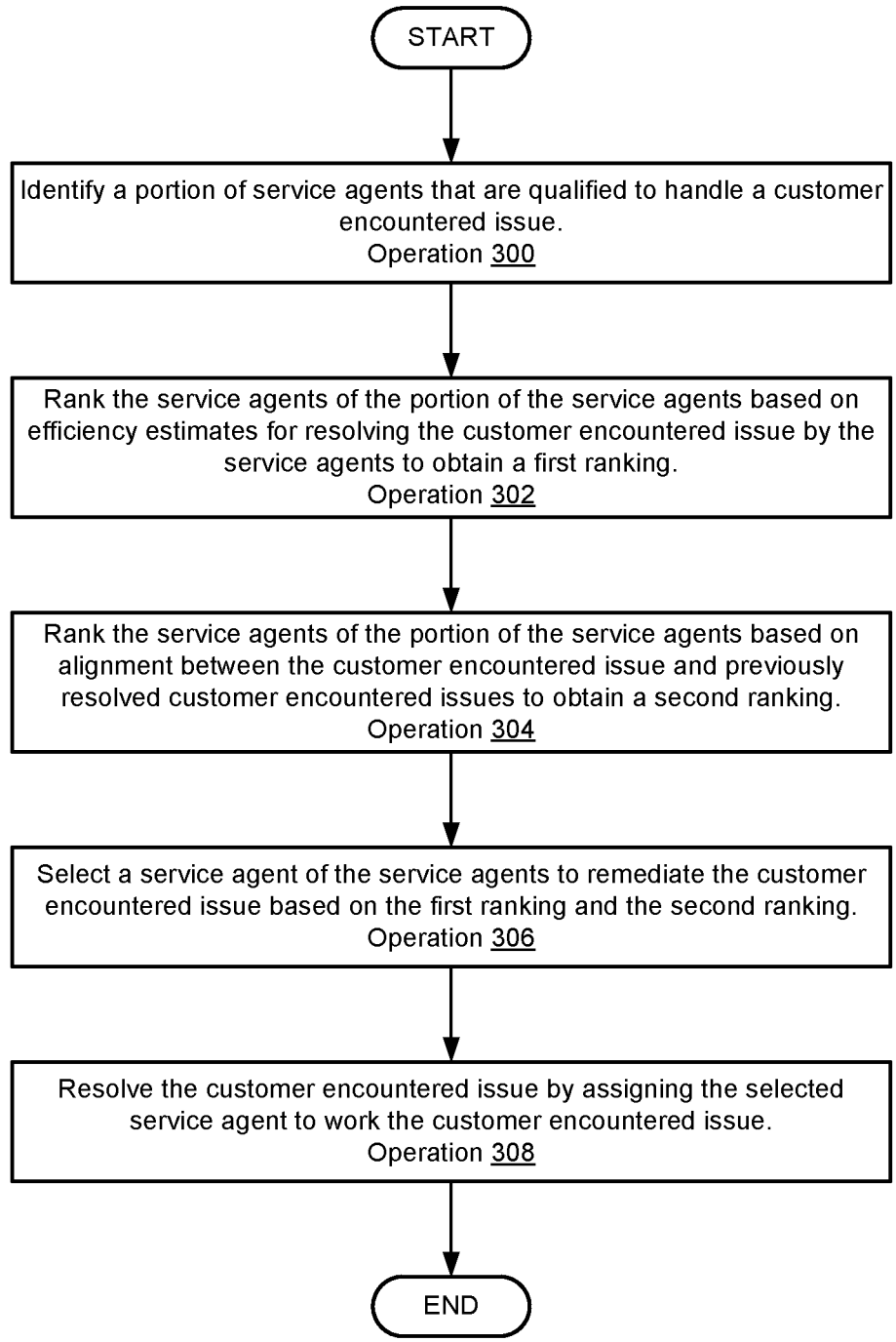
FIG. 3 shows a flow diagram illustrating a method of resolving customer-encountered issues in accordance with an embodiment.

When providing its functionality, RMS 104 may perform all, or a portion, of the methods illustrated in FIG. 3.

Any of client devices 100 and/or RMS 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

RMS 104 may be implemented with multiple computing devices. The computing devices of RMS 104 may cooperatively perform processes for managing customer-encountered issues. The computing devices of RMS 104 may perform similar and/or different functions, and may be used by different persons that may participate in the management of the customer-encountered issues. For example, RMS 104 may include multiple computing devices used by different service agents (e.g., persons) tasked with resolving customer-encountered issues. The service agents may attempt to utilize knowledge base articles to resolve the customer-encountered issues.

RMS 104 may be maintained, for example, by a business or other entity that has some degree of responsibility with respect to maintaining the operation of client devices 100. For example, RMS 104 may be operated by a business that sells client devices 100 and provides warranty or other types of support for client devices 100 to users and/or owners thereof.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

To further clarify embodiments disclosed herein, diagrams illustrating data flows implemented by and data structures used by a system over time in accordance with an embodiment are shown in FIGS. 2A-2B. In FIGS. 2A-2B, data structures are represented using a first set of shapes (e.g., 220-232) and processes are represented using a different set of shapes (e.g., 240-254).

Turning to FIG. 2A, a data flow diagram illustrating data flows, data processing, and/or other operations that may be performed by RMS 104 in accordance with an embodiment is shown.

To manage customer-encountered issues, RMS 104 may obtain service requests 220. Service requests 220 may be data structures that include information regarding the customer-encountered issues. Service requests 220 may be obtained by (i) obtaining information regarding the customer-encountered issues and (ii) adding the obtained information to a new or existing data structure representing a service request. The information may be obtained, for example, by (i) receiving the information via a portal (e.g., a website), (ii) receiving the information via phone calls, video calls, instant messages, and/or via other types of interactions with users (which may be subsequently subjected to processing to derive recordable information regarding the user and the customer encounter issue), and/or (iii) via other methods.

Service requests 220 may be analyzed to (i) identify cognitive loads 222 likely to be imposed on service agents tasked with working the service requests, and (ii) identify skill requirements 224 likely that need to be met by service agents to resolve the service requests. Cognitive loads 222 may be identified through calculation of intrinsic, extraneous, and germane components of a cognitive load likely to be placed on the service agents tasked with working service requests 220. Skill requirements 224 may be identified through taxonomic analysis of description of the customer-encountered issues upon which service requests 220 are based. The taxonomic analysis may facilitate classification of different customer-encountered issues into groups having similar taxonomic elements (e.g., terms) in the descriptions of the corresponding customer-encountered issues. Each grouping may be treated as requiring a skill associated with the group for a service agent to be proficient in resolving the service requests in the group. To identify service agents likely to have the skill, the past successful remediations of customer-encountered issues may be similarly classified into groups. The skill level for each skill of the service agents may be based on the number of service requests in each group that the service agent successfully remediated. These skills and skill levels may be stored as skill ratings 226.

When a service request of service requests 220 is obtained, the service request may drive service agent qualifying 240. Service agent qualifying 240 may use the cognitive loads 222, skill requirements 224, and skill ratings 226 to identify a set of qualified service agents. For example, the cognitive load for the service request may be used to identify a level of a service agent likely to be necessary to remediate the service request. Similarly, the skill requirements for the service request may be compared to the skill ratings (e.g., 226) for the service agents to identify those service agents that likely have the skill necessary to remediate the service request. Service agents both of the level and having the necessary skill may be added to the qualified service agents. In the event that a large number of service agents meet these criteria, then a number of the top ranked (e.g., based on skill level) service agents may be used as the qualified service agents.

While the qualified service agents may be likely to be able to resolve the service requests, the qualified service agents may be further ranked to identify a service agent that is likely to be able to remediate the customer-encountered issue in a time efficient manner. For example, the service agents may be ranked through both efficiency ranking 242 and experience ranking 244.

During efficiency ranking 242, the past performances of the qualified service agents may be evaluated to rank them with respect to likely time required to resolve the service agent. For example, when a service request is resolved, metrics regarding the resolution process may be stored as part of performance data 228. These metrics may include durations of time regarding how long a service agent took to resolve the service request after the service agent began working the service request (e.g., a time to resolution of the service request). To rank the service agents, various ability metrics including the time to resolve similar service requests for previously resolved service requests may be obtained from performance data 228. The metrics may then be averaged or otherwise analyzed to identify typical ability metrics for each of the qualified service agents with respect to the of the service request. The qualified service agents may then be ordered to obtain ranked service agents.

For example, the service agents may be ranked from shortest to longest time to resolve similar service requests, with being ranked as the shortest time to resolve being considered the best ranked service agent.

In addition to being ranked with respect to the ability metrics, the qualified service agents may be ranked with respect to the level of alignment between the service request and previously resolved service request during experience ranking 224. During experience ranking 244, the similarities (e.g., alignment) of service requests previously resolved by the qualified service agents and the service request may be evaluated to rank them. For example, for a given service agent, the service request that the service agent previously resolved may be analyzed with respect to its attributes. These attributes may include, for example, (i) a product grouping related to the service request, (ii) a product reporting group related to the service request, (iii) a case type of the service request, (iv) a case error code of the service request, (v) a case microcode of the service request, (vi) a software version related to the service request, (vii) a severity level of the service request, (viii) a case top level category of the service request, (ix) a case detailed category of the service request, and/or (x) other types of attributes of previously resolved service requests and/or associated customer-encountered issues.

These attributes may then be compared to similar attributes of the service request to identify a level of alignment between the service requests and other service requests that the service agent has previously resolved. The level of alignment may, for example, be calculated numerically. For example, a score of 1 may be assigned for a matching attribute and a score of 0 for a different attribute, and the scores assigned for each of the attributes may be summed to obtain a numerical score representing the level of alignment between the service requests and other service requests resolved by a service agent.

The levels of alignment may then be used to rank the qualified service agents with respect to one another. For example, the numerical scores representing the level of alignment between the service request and the other service requests may be summed to calculate an aggregate score. In another example, the numerical scores representing the level of alignment between the service request and a predetermined number of the other service requests (e.g., that are the most aligned) may be summed to calculate an aggregate score. The level of alignment (e.g., numerical scores) may be used differently to rank the qualified service agents.

Once experience ranking 244 and efficiency ranking 242 are complete (while illustrated as being sequentially performed, it will be appreciated that these maybe performed in different orders and/or in parallel), multiply ranked service agents may be available for additional analysis. For example, the multiple rankings ascribed to the qualified service agents through efficiency ranking 242 and experience ranking 244 may indicate which of the service agent, if available, is likely to most efficiently resolve the service request. However, because service agents may be tasked with resolving other service requests, it may not be desirable to always assign the service agent that is likely to most efficiently resolve the service request to work the service request.

To determine which of the qualifies service agents to assign to work the service request, scheduling 246 may be performed. Scheduling 246 may take into account the ranking of the qualified service agents and other factors that may delay resolution of the service request if assigned to a particular service agent. These other factors may include (i) a current workload of the service agent, (ii) a location where the service agent is located and location where the service agent may need to travel to work the service request, (iii) a level of severity of impact of the customer-encountered issue associated with the service request, (iv) a level of financial cost for tasking the a service agent, (v) an existing level of cognitive load imposed on the service agent due to existing assignment, (vi) a cost (e.g., time, cognitive load, etc.) for switching from current assignments to working the service request, and (vii) a goal time for resolving the service request. For example, these factors may each be represented by a numerical value. Information usable to quantify these factors into the numerical value may be stored in service agent workloads 232 (e.g., which may store information regarding these factors and rules for scoring these factors). The scores for these factors may be used to further rank and refine the multiple ranked service agents to identify an ordering of the service agents from most desirable to be assigned to work the service request to least desirable to work the service request.

The service agent ranked most desirable may be assigned to work the service request. Once assigned, service request remediating 248 may be performed with the assigned service agent. For example, the assigned service agent may work the service request until resolved (or escalated to another service agent if the assigned service agent is unable to resolve the service request). Once remediated, documenting 250 may be performed so that the resolved service request is taken into account during future selections of service agents to work service requests.

Thus, by implementing the flow shown in FIG. 2A, a system in accordance with embodiments disclosed herein may be more likely to assign service agents that are likely to remediate the service requests in a time efficient manner based on their past experience and have sufficient bandwidth, cognitive reserves, and other capabilities to remediate the service request within prescribed time, cost, and other goals.

Turning to FIG. 2B, a data flow diagram illustrating data flows, data processing, and/or other operations that may be performed by RMS 104 in accordance with an embodiment is shown. The processes illustrated in FIG. 2B may be used to update information sources upon which service agents are assigned to work service requests. FIG. 2B may be an expansion of documenting 250 shown in FIG. 2A.

After a service request is remediated, issue analysis 252 and performance analysis 254 may be performed.

During issue analysis 252, a customer-encountered issues resolved during a service request remediation may be analyzed to identify attributes to ascribe to the service request. For example, the customer-encountered issue may be analyzed to identify (i) products involved in the customer-encountered issue (e.g., software, hardware, etc.), (ii) groups to which the involved products are members (e.g., solution architectures which may include a combination of hardware and software), (iii) a type of the customer-encountered issue (e.g., based on how it was initially reported, what it involves, etc.), (iv) error codes that lead to the identification of the customer-encountered issue, (v) micro-codes from telemetry data and/or other sources that lead to and/or are otherwise related to the customer-encountered issue, (vi) software versions and/or other information regarding software involved in the customer-encountered issue, (vii) the severity of impact of the customer-encountered issue (e.g., number of impacted systems, users, etc.), (viii) a top level of the customer-encountered issue in a classification system that classifies customer-encountered issues into different groups in a hierarchy, and/or (ix) a detailed category of the customer-encountered issue in a classification system that classifies customer-encountered issues into different groups in a hierarchy. These attributes may be stored in resolved issues 230 so that new service agent experience metrics are identified during future assignments of service agents to work service requests.

During performance analysis 252, a remediation of a customer-encountered issue may be analyzed to identify ability metrics to ascribe to a service agent that completed the request. For example, the time from when the service agent began to work a service request for the customer-encountered issue to a time that the service request was resolved (e.g., a time to resolution) may be stored in performance data 228. The value representing the time to resolution may normalized to the average time for resolving each type of customer-encountered issue.

For example, consider a scenario in which, on average across all service agents, service requests for a particular type of customer-encountered issue take 10 hours to resolve. Each time to resolution may be normalized to that 10 hour period of time. If, for example, a first agent resolves, on average, instances of the type of the customer-encountered issue in 6 hours, then the first agent may be ascribed a value of 0.6 (i.e., 6/10). In contrast, for example, if a second agent resolves, on average, instances of the type of the customer-encountered issue in 13 hours, then the second agent may be ascribed a value of 1.3 (i.e., 13/10).

The resulting performance data 228 may specify, for each service agent, a numerical value representing the average time to resolve each type of service request. Performance data 228 may specify other values representing other characterizations regarding each service agent's likely future performance when working service requests.

Thus, via the processes illustrated in FIG. 2B, a system in accordance with an embodiment may automatically record information usable to make service agent assignments in the future that are more likely to meet goals for resolving service requests (e.g., time goals, financial goals, etc.).

In an embodiment, RMS 104 is implemented using a hardware device including circuitry. The hardware device may be, for example, a digital signal processor, a field programmable gate array, or an application specific integrated circuit. The circuitry may be adapted to cause the hardware device to perform the functionality of RMS 104 such as service agent qualifying 240, efficiency ranking 242, experience ranking 244, scheduling 246, service request remediating 248, document 250, issue analysis 252, performance analysis 254, and/or other processes. RMS 104 may be implemented using other types of hardware devices without departing embodiment disclosed herein.

In one embodiment, RMS 104 is implemented using a processor adapted to execute computing code stored on a persistent storage that when executed by the processor performs the functionality of RMS 104 discussed throughout this application such as service agent qualifying 240, efficiency ranking 242, experience ranking 244, scheduling 246, service request remediating 248, document 250, issue analysis 252, performance analysis 254, and/or other processes. The processor may be a hardware processor including circuitry such as, for example, a central processing unit, a processing core, or a microcontroller. The processor may be other types of hardware devices for processing information without departing embodiment disclosed herein.

In an embodiment, RMS 104 includes storage which may be implemented using physical devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage may include a memory device (e.g., a dual in line memory device) in which data is stored and from which copies of previously stored data are provided. In another example, storage may include a persistent storage device (e.g., a solid-state disk drive) in which data is stored and from which copies of previously stored data is provided. In a still further example, storage may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage may store data structures including service requests 220, cognitive loads 222, skill requirements 224, skill ratings 226, performance data 228, resolved issues 230, service agent workloads 232, and/or other data structures. Any of these data structures may be implemented using, for example, lists, tables databases, linked lists, unstructured data, and/or other types of data structures.

As discussed above, the components of FIG. 1 may perform various methods to manage customer-encountered issues. FIG. 3 illustrates methods that may be performed by the components of FIG. 1. In the diagrams discussed below and shown in FIG. 3, any of the operations may be repeated, performed in different orders, and/or performed in parallel with or in a partially overlapping in time manner with other operations.

Turning to FIG. 3, a flow diagram illustrating a method of resolving customer-encountered issues in accordance with an embodiment is shown. The method may be performed by RMS 104 or other components of the system shown in FIG. 1.

At operation 300, a portion of service agents that are qualified to handle a customer-encountered issue are identified. The portion of the service agents may be identified through (i) cognitive load estimation to identify a service agent level likely to be able to resolve the customer-encountered issue and (ii) a skills analysis to identify skills likely to be needed to resolve the customer-encountered issue and service agents having the skills. The cognitive load estimation and skill analysis may discriminate the portion of the service agents from other service agents.

At operation 302, the service agents of the portion of the service agents may be ranked based on efficiency estimates for resolving the customer-encountered issue by the service agents to obtain a first ranking. The ranking may be obtained by (i) identifying times to resolve similar customer-encountered issues that the service agents have previously resolved, (ii) calculated average resolution times for each of the agents, and (iii) ranking the service agents based on the average resolution times. The similar customer-encountered issues may be discriminated from dissimilar customer-encountered issues using any discrimination criteria.

At operation 304, the service agents of the portion of the service agents are ranked based on alignment between the customer-encountered issue and previously resolved customer-encountered issues to obtain a second ranking. The ranking may be obtained by (i) identifying attributes of customer-encountered issues that have been previously resolved by the service agents and are similar to the customer-encountered issue, (ii) identifying attributes of the customer-encountered issue, (iii) calculating a numerical value representing the alignment between the customer-encountered issue and each of the previously resolved customer-encountered issue based on similarities and differences between the parameters, and (iv) ranking the service agents based on the numerical values representing the alignment between the customer-encountered issues resolved by each service agent and the customer-encountered issue.

At operation 306, a service agent of the service agents is selected to remediate the customer-encountered issue based on the first ranking and the second ranking. The service agent may be selected through a scheduling analysis that further ranks the service agents based on their current workload, existing cognitive load (e.g., due to existing work assignment), change in cognitive load should a service agent be assigned to remediate the customer-encountered issue, and/or other factors that may indicate when a service agent is likely to be able to resolve the customer-encountered issue. Additionally, other factors such as a financial cost per unit time ascribed to each service agent may be taken into account. These factors and the rankings may be used to identify the service agent to select through, for example, evaluation of an objective function or other tool for multivariate analysis and optimization. The objective function may take the rankings and factors as input, ascribe numerical values usable to relatively rank the service agents, and the best ranked service agent may be selected.

At operation 308, the customer-encountered issue is resolved by assigning the selected service agent to work the customer-encountered issue. The service agent may be assigned by, for example, populating a workflow management system or other system with information indicating that the assigned service agent is responsible for resolving the customer-encountered issue.

The method may end following operation 308.

Once the customer-encountered issue is resolved, information regarding the customer-encountered issue and the service agent's performance during the resolution may be used to update information upon which future service agent selections are made.

Using the method illustrated in FIG. 3, a system in accordance with an embodiment may assign service requests to service agents that are more likely to resolve customer-encountered issue within prescribed goals.

Figure 4:
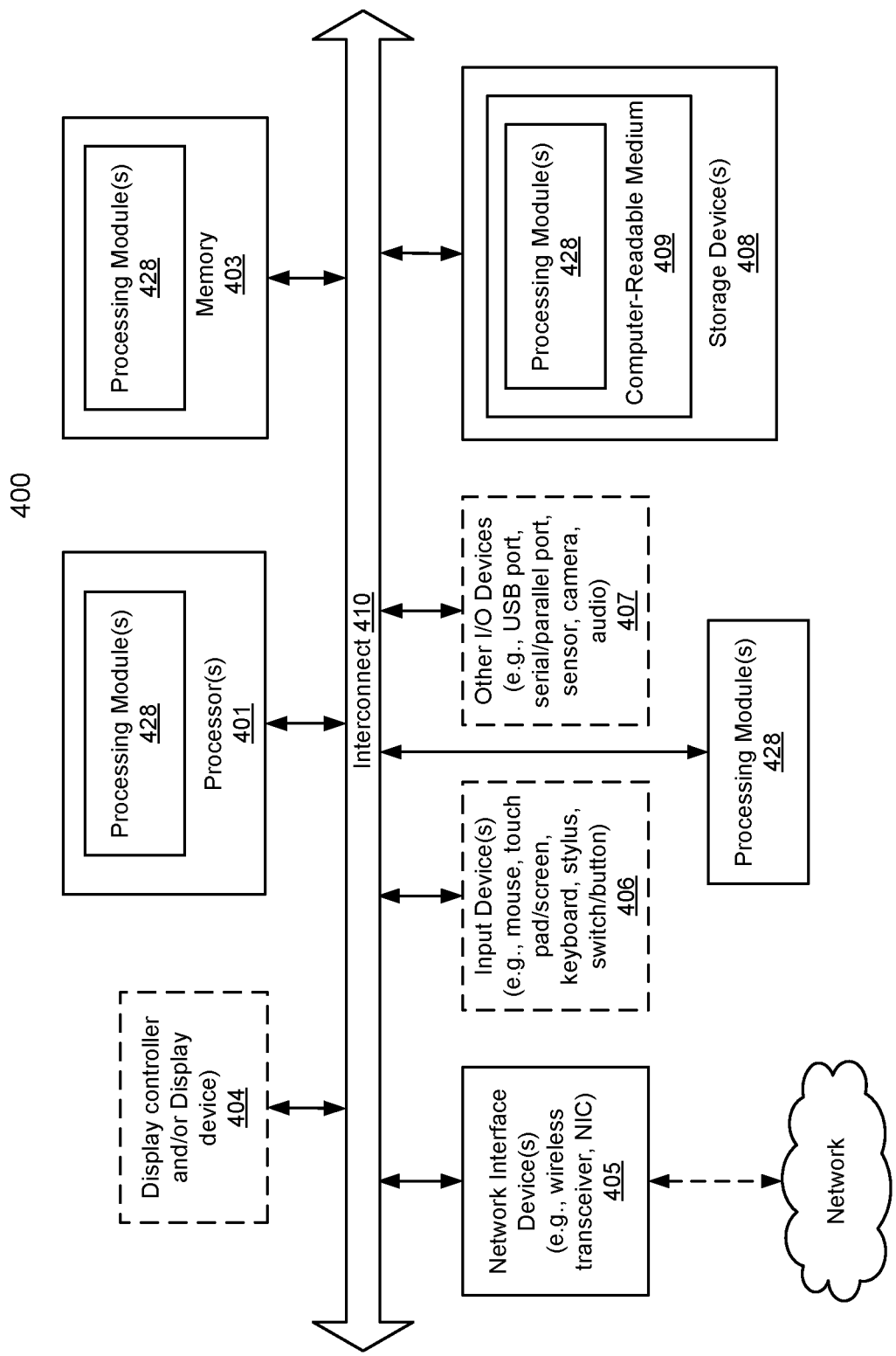
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing customer-encountered issues using service agents, the method being performed by a response management system (RMS) embodied by a data processing system and comprising:

obtaining, by the data processing system, the customer encountered issues, wherein the customer-encountered issues are stored in a storage of the data processing system and a processing of each of the customer-encountered issues requires consumption of a first quantity of limited computing resources of the processor and the storage, and wherein a first number of the customer-encountered issues is resolved per a unit of time based on the first quantity;

performing, by a processor of the data processing system performing the method, a multiphase optimization procedure to reduce the required consumption from the first quantity of limited computing resources to a second quantity lower than the first quantity such that a second number of the customer-encountered issues is resolved per the unit of time based on the second quantity wherein the second number is larger than the first number, the multiphase optimization procedure comprising:

identifying, as a first phase of the multiphase optimization procedure, a portion of the service agents that are qualified to handle a customer-encountered issue of the customer-encountered issues;

ranking, during a second phase of the multiphase optimization procedure, the service agents of the portion of the service agents based on efficiency estimates for resolving the customer-encountered issue by the service agents to obtain a first ranking;

further ranking, during the second phase of the multiphase optimization procedure, the service agents of the portion of the service agents based on alignment between the customer-encountered issue and previously resolved customer-encountered issues to obtain a second ranking, wherein all rankings performed during the second phase are performed independently of a scheduling availability of the portion of the service agents; and selecting, during a third phase of the multiphase optimization procedure, a service agent of the service agents to remediate the customer-encountered issue based on the first ranking and the second ranking, wherein the scheduling availability of the portion of the service agents is assessed for the first time during the third phase; and assigning, by the processor, the selected service agent to work and resolve the customer-encountered issue.

2. The method of claim 1, wherein the portion of the service agents is identified based on a cognitive load estimate for resolving the customer-encountered issue, a skill estimate for resolving the customer-encountered issue, and skill ratings for the portion of the service agents.

3. The method of claim 2, wherein ranking the service agents of the portion of the service agents based on the efficiency estimates for resolving the customer-encountered issue comprises:

identifying a type of the customer-encountered issue;

for each service agent of the portion of the service, identify an average time to resolution of previously resolved customer-encountered issues of the type of the customer-encountered issue and that were resolved by each service agent;

ordering the service agents of the portion of the service agents based on the average time to resolution associated with each of the service agents of the portion of the service agents to obtain the first ranking.

4. The method of claim 3, wherein ranking the service agents of the portion of the service agents based on the alignment between the customer-encountered issue and other customer-encountered issues resolved by the service agents to obtain a second ranking comprises:

identifying attributes of the customer-encountered issue;

for each service agent of the portion of the service:

identify attributes of the previously resolved customer-encountered issues that were resolved by each service agent, and obtaining a metric indicating a level of the alignment between the attributes of the customer-encountered issue and the attributes of the previously resolved customer-encountered issues that were resolved by each service agent;

ordering the service agents of the portion of the service agents based on the metric to obtain the second ranking.

5. The method of claim 4, wherein selecting the service agent of the service agents to remediate the customer-encountered issue based on the first ranking and the second ranking comprises:

identifying a sub-portion of the portion of the service agents based on the first ranking and the second ranking; and identifying a service agent of the sub-portion of the portion of the service agents that has available cognitive bandwidth to resolve the customer-encountered issue within a time to resolution goal, the available cognitive bandwidth being based on the scheduling availability of the portion of the service agents.

6. The method of claim 5, wherein the time to resolution goal is based, at least in part, a context switching time for the customer-encountered issue.

7. The method of claim 4, wherein obtaining the metric indicating the level of the alignment comprises:

identifying, for the customer-encountered issue, at least one attribute of the attributes from a group consisting of:

a product grouping;

a product reporting group;

a case type;

a case error code;

a case microcode;

a software version;

a severity level;

a top level case category; and a case detailed category.

8. The method of claim 7, wherein obtaining the metric indicating the level of the alignment further comprises:

comparing the identified at least one of the attributes to corresponding attributes of the previously resolved customer-encountered issues on a per attribute basis to identify aligned attributes and unaligned attributes; and calculating the metric based on the aligned attributes and unaligned attributes.

9. A non-transitory machine-readable medium having instructions stored therein, which when executed by a processor of a data processing system configured as a response management system (RMS), cause the processor to perform operations for managing customer-encountered issues using service agents, the operations comprising:

obtaining, by the data processing system, the customer encountered issues, wherein the customer-encountered issues are stored in a storage of the data processing system and a processing of each of the customer-encountered issues requires consumption of a first quantity of limited computing resources of the processor and the storage, and wherein a first number of the customer-encountered issues is resolved per a unit of time based on the first quantity;

performing, by the processor, a multiphase optimization procedure to reduce the required consumption from the first quantity of limited computing resources to a second quantity lower than the first quantity such that a second number of the customer-encountered issues is resolved per the unit of time based on the second quantity wherein the second number is larger than the first number, the multiphase optimization procedure comprising:

identifying, as a first phase of the multiphase optimization procedure, a portion of the service agents that are qualified to handle a customer-encountered issue of the customer-encountered issues;

ranking, during a second phase of the multiphase optimization procedure, the service agents of the portion of the service agents based on efficiency estimates for resolving the customer-encountered issue by the service agents to obtain a first ranking;

further ranking, during the second phase of the multiphase optimization procedure, the service agents of the portion of the service agents based on alignment between the customer-encountered issue and previously resolved customer-encountered issues to obtain a second ranking, wherein all rankings performed during the second phase are performed independently of a scheduling availability of the portion of the service agents; and selecting, during a third phase of the multiphase optimization procedure, a service agent of the service agents to remediate the customer-encountered issue based on the first ranking and the second ranking, wherein the scheduling availability of the portion of the service agents is assessed for the first time during the third phase; and assigning, by the processor, the selected service agent to work and resolve the customer- encountered issue.

10. The non-transitory machine-readable medium of claim 9, wherein the portion of the service agents is identified based on a cognitive load estimate for resolving the customer-encountered issue, a skill estimate for resolving the customer-encountered issue, and skill ratings for the portion of the service agents.

11. The non-transitory machine-readable medium of claim 10, wherein ranking the service agents of the portion of the service agents based on the efficiency estimates for resolving the customer-encountered issue comprises:

identifying a type of the customer-encountered issue;

for each service agent of the portion of the service, identify an average time to resolution of previously resolved customer-encountered issues of the type of the customer-encountered issue and that were resolved by each service agent;

ordering the service agents of the portion of the service agents based on the average time to resolution associated with each of the service agents of the portion of the service agents to obtain the first ranking.

12. The non-transitory machine-readable medium of claim 11, wherein ranking the service agents of the portion of the service agents based on the alignment between the customer-encountered issue and other customer-encountered issues resolved by the service agents to obtain a second ranking comprises:

identifying attributes of the customer-encountered issue;

for each service agent of the portion of the service:

identify attributes of the previously resolved customer-encountered issues that were resolved by each service agent, and obtaining a metric indicating a level of the alignment between the attributes of the customer-encountered issue and the attributes of the previously resolved customer-encountered issues that were resolved by each service agent;

ordering the service agents of the portion of the service agents based on the metric to obtain the second ranking.

13. The non-transitory machine-readable medium of claim 12, wherein selecting the service agent of the service agents to remediate the customer-encountered issue based on the first ranking and the second ranking comprises:

identifying a sub-portion of the portion of the service agents based on the first ranking and the second ranking; and identifying a service agent of the sub-portion of the portion of the service agents that has available cognitive bandwidth to resolve the customer-encountered issue within a time to resolution goal, the available cognitive bandwidth being based on the scheduling availability of the portion of the service agents.

14. The non-transitory machine-readable medium of claim 13, wherein the time to resolution goal is based, at least in part, a context switching time for the customer-encountered issue.

15. The non-transitory machine-readable medium of claim 12, wherein obtaining the metric indicating the level of the alignment comprises:

identifying, for the customer-encountered issue, at least one attribute of the attributes from a group consisting of:

a product grouping;
a product reporting group;
a case type;
a case error code;
a case microcode;
a software version;
a severity level;
a top level case category; and
a case detailed category.

16. The non-transitory machine-readable medium of claim 15, wherein obtaining the metric indicating the level of the alignment further comprises:

comparing the identified at least one of the attributes to corresponding attributes of the previously resolved customer-encountered issues on a per attribute basis to identify aligned attributes and unaligned attributes; and calculating the metric based on the aligned attributes and unaligned attributes.

17. A data processing system configured as a response management system (RMS), comprising:

a processor; and a memory coupled to the processor to store instructions, which when executed by the processor, cause the processor to perform operations for managing customer-encountered issues using service agents, the operations comprising:

obtaining, by the data processing system, the customer encountered issues, wherein the customer-encountered issues are stored in a storage of the data processing system and a processing of each of the customer-encountered issues requires consumption of a first quantity of limited computing resources of the processor and the storage, and wherein a first number of the customer-encountered issues is resolved per a unit of time based on the first quantity;

performing, by the processor, a multiphase optimization procedure to reduce the required consumption from the first quantity of limited computing resources to a second quantity lower than the first quantity such that a second number of the customer-encountered issues is resolved per the unit of time based on the second quantity wherein the second number is larger than the first number, the multiphase optimization procedure comprising:

identifying, as a first phase of the multiphase optimization procedure, a portion of the service agents that are qualified to handle a customer-encountered issue of the customer-encountered issues;

ranking, during a second phase of the multiphase optimization procedure, the service agents of the portion of the service agents based on efficiency estimates for resolving the customer-encountered issue by the service agents to obtain a first ranking;

further ranking, during the second phase of the multiphase optimization procedure, the service agents of the portion of the service agents based on alignment between the customer-encountered issue and previously resolved customer-encountered issues to obtain a second ranking, wherein all rankings performed during the second phase are performed independently of a scheduling availability of the portion of the service agents; and selecting, during a third phase of the multiphase optimization procedure, a service agent of the service agents to remediate the customer-encountered issue based on the first ranking and the second ranking, wherein the scheduling availability of the portion of the service agents is assessed for the first time during the third phase; and assigning, by the processor, the selected service agent to work and resolve the customer-encountered issue.

18. The data processing system of claim 17, wherein the portion of the service agents is identified based on a cognitive load estimate for resolving the customer-encountered issue, a skill estimate for resolving the customer-encountered issue, and skill ratings for the portion of the service agents.

19. The data processing system of claim 18, wherein ranking the service agents of the portion of the service agents based on the efficiency estimates for resolving the customer-encountered issue comprises:

identifying a type of the customer-encountered issue;

for each service agent of the portion of the service, identify an average time to resolution of previously resolved customer-encountered issues of the type of the customer-encountered issue and that were resolved by each service agent;

ordering the service agents of the portion of the service agents based on the average time to resolution associated with each of the service agents of the portion of the service agents to obtain the first ranking.

20. The data processing system of claim 19, wherein ranking the service agents of the portion of the service agents based on the alignment between the customer-encountered issue and other customer-encountered issues resolved by the service agents to obtain a second ranking comprises:

identifying attributes of the customer-encountered issue;

for each service agent of the portion of the service:

identify attributes of the previously resolved customer-encountered issues that were resolved by each service agent, and obtaining a metric indicating a level of the alignment between the attributes of the customer-encountered issue and the attributes of the previously resolved customer-encountered issues that were resolved by each service agent;

ordering the service agents of the portion of the service agents based on the metric to obtain the second ranking.

\* \* \* \* \*